Aug. 5, 1969     L. M. LITZ ET AL     3,459,510
HYDROGEN GENERATOR
Filed Dec. 28, 1965
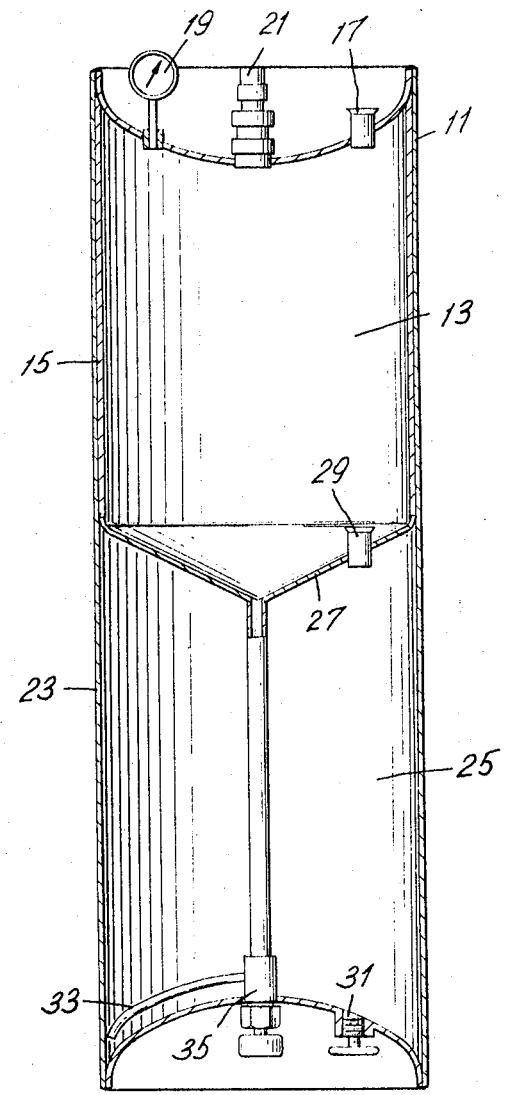
INVENTORS
LAWRENCE M. LITZ
JACK E. ROTHFLEISCH
BY William R. Moran
ATTORNEY 3,459,510
HYDROGEN GENERATOR
Lawrence M. Litz, Lakewood, and Jack E. Rothfleisch, Westlake, Ohio, assignors to Union Carbide Corporation, a corporation of New York
Filed Dec. 28, 1965, Ser. No. 516,915
Int. Cl. B01j 7/02
U.S. Cl. 23—282                    3 Claims

ABSTRACT OF THE DISCLOSURE

A portable, self-contained apparatus for the generation of hydrogen gas resulting from the contact of a liquid fuel with a solid metallic catalyst, such apparatus having the ability to vary the hydrogen production rate automatically as required to satisfy a variable consumption rate.

---

This invention relates to a novel apparatus for generating hydrogen gas. In one aspect, this invention relates to a novel process for generating hydrogen gas at a relatively constant flow rate. In a further aspect, this invention relates to a compact, portable, self-contained apparatus having the ability to vary the hydrogen production rate automatically as required to satisfy a variable consumption rate.

Hydrogen, as in the case with many industrial gases, is usually supplied in gaseous form under pressure in steel cylinders having capacities of several hundred cubic feet. As hydrogen is needed, it is merely withdrawn from the cylinder through one or more pressure reduction valves to provide a relatively constant flow of gas. Although the use of cylinder hydrogen is economically attractive and adequate for most industrial and commercial purposes, there are some instances wherein a mobile, lightweight source is desired. For example, recent developments in fuel cell technology have resulted in lightweight, compact units capable of providing a continuous source of electricity by the catalytic interaction of hydrogen and oxygen. These units are of particular use in providing electricity for portable communication systems, radios, motor vehicles, and the like. Inasmuch as oxygen can be obtained from the air, the only other fuel required is hydrogen. However, in order to maintain the mobility of the fuel cell unit and its independence of a fixed hydrogen source, the hydrogen, of necessity, must be furnished from a similarly compact and lightweight source. Cylinder hydrogen wherein the gas is stored under pressure does not readily lend itself to use in those instances wherein a compact, lightweight unit is desired.

It has now been found that the aforementioned disadvantages can largely be overcome by generating the hydrogen gas as needed. Moreover, it has also been discovered that the hydrogen generator of this invention overcomes many of the disadvantages of other generators previously reported in the literature.

It is therefore an object of this invention to provide a novel apparatus for generating hydrogen gas. Another object of this invention is to provide a novel apparatus for generating hydrogen gas at a relatively constant flow rate. A further object of this invention is to provide a portable, lightweight, self-contained apparatus having the ability to vary the hydrogen production rate automatically as required to satisfy a variable consumption rate. Another object is to provide a portable apparatus suitable as a source of hydrogen gas for fuel cells. A further object is to provide a novel process for the generation of hydrogen gas at a relatively constant flow rate. These and other objects will readily become apparent to those skilled in the art in the light of the teachings herein set forth.

In its broad aspect, the present invention relates to a hydrogen generator which is both compact and portable and which has the ability to vary the hydrogen production rate automatically to satisfy a variable consumption rate. The invention will now be described in greater detail with reference to the appended drawing.

The single drawing is a cross-sectional view of one embodiment of the apparatus according to the present invention.

The apparatus comprises an upper first body section 11 having a reaction chamber 13 and a catalyst zone 15. A pressure relief valve 17 is provided in a wall of the first body section to connect the reaction chamber 13 with the environment exterior of the apparatus. The first body section is also provided with an exterior pressure indicator 19 and a quick disconnect fitting 21 connecting the upper portion of the reaction chamber to the exterior of the apparatus. The quick disconnect has a shut off which closes the reaction chamber 13 to the atmosphere. When the male member of a conduit is plugged into the fitting, the shut off is opened and generated hydrogen can then pass out of the apparatus to its desired end use. A second body section 23 having a fuel chamber 25 is arranged contiguous to the first body section 11 and the two body portions are sealably separated by a conical shaped barrier 27 which is provided with a pressure relief valve 29. A sealable inlet means 31 is provided in a wall of the second body section 23 to provide access to the fuel chamber for filling and cleaning. The second body section 23 is also provided with a passage 33 fitted with a cut-off valve 35 connecting the lower portion of the fuel chamber 25 to the lower portion of the reaction chamber 13.

In the embodiment shown in the drawing, the catalyst zone 15 lines the interior wall of the reaction chamber 13 commencing at a point near the junction of the upper body section 11 and the barrier 27 and extending to the top of the chamber. The catalyst, as hereinafter defined, can be composed of a variety of materials. However, Raney nickel is preferred. The catalyst is disposed in the reaction chamber in such a manner that as the fuel level rises in the chamber it comes in contact with an increasingly greater catalyst surface area. As previously indicated, the reaction chamber is also fitted with a pressure indicator 19, and a pressure relief valve 17 and means for conducting the hydrogen gas to the exterior of the apparatus.

Contiguous to the first body section is the second body section 23 containing the fuel chamber 25. Although a wide variety of fuels can be employed, as hereinafter indicated, the preferred fuel for use as the source of hydrogen is sodium borohydride. The fuel utilized in the apparatus of this invention should preferably be soluble in water. Thus, it is possible to store the apparatus containing the fuel in dry form and merely add water to the fuel chamber prior to use.

Incorporation of an entrainment separator as well as a desiccant or condenser will usually be necssary to prevent plugging of any pressure regulators between the generator and the equipment utilizing the hydrogen gas. A combination entrainment separator and cooling unit can easily be built into the apparatus just below the quick disconnect, or if desired, attached as a separate unit on the exterior of the generator.

In practice, the hydrogen generator is easily activated and when in operation provides a flow of hydrogen gas, the rate of production of which varies automatically to satisfy a variable consumption rate. Referring to the drawing and the description which follows, it will be seen that the apparatus is relatively simple to operate and provides features not previously found in gas generators. For example, a particularly novel feature of the apparatus of this invention is that the rate of hydrogen formation is controlled by the rate at which the gas is withdrawn from the generator.

Prior to using the generator the solvent, preferably water, is added to the fuel chamber 25 containing the solid sodium borohydride pellets or other fuel source. It is also necessary to add sodium hydroxide or other suitable base to the fuel chamber in order to increase the stability of the borohydride solution and thus control the autodecomposition of the fuel particularly at elevated temperatures. For example, a solution containing 210 grams of sodium borohydride, 16 grams of sodium hydroxide, and 840 grams of water exhibited adequate stability for twelve hours when run at a 60 watt rate. The pH of this solution was approximately 13.5. Since the autodecomposition rate of a sodium borohydride solution is temperature dependent, the amount of sodium hydroxide required to prevent an excessive rate will depend upon the equilibrium temperature attained by the system. This temperature is dependent upon the required hydrogen generation rate which defines the rate of heat generation by the exothermic decomposition reaction, and upon the system geometry which defines the rate at which the heat of reaction is transferred to the surroundings.

Pressurization of the fuel chamber in order to force the fuel into the reaction chamber can be achieved in a variety of ways. For instance the fuel chamber can be pressurized with an inert gas such as nitrogen just after the water, fuel and hydroxide are added. Thereafter, the generator need only be shaken to dissolve the solids and the generator is ready for operation. When it is desired to generate hydrogen, the cutoff valve 35 is opened and the pressure in the fuel chamber forces the aqueous fuel mixture up through passage 33 to the reaction chamber 13 where it contacts the catalyst and decomposes with the evolution of hydrogen gas. As the liquid fuel level rises, it contacts a greater surface area of catalyst and the rate of hydrogen generation increases. When the hydrogen gas is withdrawn from the generator at a rate substantially less than the rate at which it is generated, the pressure of the gas increases in the reaction chamber and forces the liquid level of the fuel back into the fuel chamber. Thus, as the amount of the fuel in contact with the catalyst decreases, the rate of hydrogen generation likewise decreases. Similarly, if large quantities of gas are withdrawn from the generator, the hydrogen pressure in the reaction chamber will be low enough to permit the greater pressure in the fuel chamber to again force fuel into the reaction chamber where additional hydrogen is again generated. Thus, the rate at which the fuel enters the reaction chamber is controlled by the pressure in the fuel chamber, and the hydrogen pressure in the reaction chamber.

An alternative method of pressurization consists of the addition of a small capsule of sodium metal or lithium hydride to the fuel chamber. Upon contact with water, hydrogen gas is formed and the fuel chamber is automatically pressurized. This provides a convenient method for pressurizing the fuel chamber when the generator is used at repeated intervals.

As previously indicated, the preferred catalyst for use in the apparatus of this invention is Raney nickel. However, other catalysts can also be employed to effect the decomposition of the sodium borohydride into hydrogen gas. For example, the catalysts which can be utilized include the noble metal catalysts. For example, all the Group VIII metals of the Periodic System have been found to be operable with the exception of iron and cobalt. In addition to Raney nickel other catalysts which are effective are rhodium, platinum, iridium on alumina and the like. The catalyst should, of course, be employed in such a manner that it presents a high surface area for reaction with the borohydride. For instance, the catalyst can be contained on an inert support and need not necessarily line the walls of the reaction chamber. If desired the catalyst can be contained on the surface of non-porous pellets, non-porous vertical rods, or the like.

Although sodium borohydride is the preferred fuel, other compounds which on decomposition give off hydrogen, can also be employed. For instance, other hydrides or borohydrides, such as potassium borohydride, are suitable.

As hereinbefore indicated, the apparatus of this invention is useful in applications requiring a relatively constant flow of hydrogen gas. Moreover, inasmuch as the apparatus is a lightweight self-contained unit, it can be transported easily and hence, is suitable for use in those areas where hydrogen gas is not readily available from other sources. Due to its compact nature, this apparatus is also particularly useful as a source of hydrogen gas for the operation of fuel cells.

For example, it was found that a generator constructed in accordance with the teachings of this invention was capable of producing sufficient hydrogen to operate a 60-watt fuel cell battery for 12 hours. This was achieved by the catalytic decomposition of an alkaline solution of sodium borohydride when contacted with Raney nickel. The experiment was conducted in an apparatus similar to that shown in the drawing. It was a two-chambered cylindrical vessel of stainless steel, having a length of 12.5 inches and an overall diameter of 4 inches. The catalyst zone was a 45 gram, 4 inch by 12 inch sheet of sintered nickel—Raney nickel on a porous nickel substrate and lined the wall of the upper reaction chamber. The lower chamber of the generator was charged with a solution containing 210 g. $NaBH_4$ pellets, 16 g. NaOH pellets, and 840 ml. $H_2O$ and then pressurized with nitrogen to obtain the differential between the two chambers required for start-up. Upon opening a valve in a line connecting the two chambers, some of the fuel solution was fed into the upper chamber and reacted to release hydrogen on contact with the Raney nickel sheet. At the pressure in the reaction chamber increased, the fuel was pushed back into the lower chamber decreasing the area of catalyst in contact with the fuel and decreasing the rate of gas generation. When gas was removed from the reaction chamber the resulting pressure differential allowed the liquid level in the upper chamber to rise and the rate was increased. For five separate runs the total hydrogen gas produced ranged from 526 to 538 liters at 23° C. versus the theoretical total of 529 liters based on a 95 percent purity of the sodium borohydride pellets. The estimated gas volume available at the required rate of 0.70 liter per minute at 23° C., ranged from 494 to 522 liters representing full load operation of a 60-watt battery for periods ranging from 11 hours 46 minutes to 12 hours 26 minutes.

In another experiment to demonstrate that a generator could be stored while containing all of the necessary ingredients, including water, a run was made in which 840 milliliters of 0.5 NaOH was charged to the upper chamber, which was then pressurized to 100 p.s.i.g., while the $NaBH_4$ pellets were loaded into the lower chamber. In these tests, opening the valve between the chambers drove most of the NaOH solution into the lower chamber and equilibrated the pressure in both chambers at 19 p.s.i.g. Closing the valve and shaking the unit for about five minutes dissolved the $NaBH_4$ pellets after which venting the upper chamber to the atmosphere put the generator in the same condition for start-up as in the previous experiments.

As previously indicated, the generators of this invention are lightweight and ideally suited for use in areas where ease of mobility is a factor. For example, an apparatus prepared from stainless steel in accordance with the teachings of this invention and having a length of about 14 inches and an overall diameter of about 4 inches, weighed about 3.0 pounds before charging with water, and about 4.75 pounds when fully charged. This apparatus was found to be suitable for supplying hydrogen at a gas rate of approximately 1.0 standard liter per minute for a period of up to 12 hours.

Although the invention has been illustrated by the foregoing discussion, it is not to be construed as limited to the materials employed therein; but rather the invention encompasses the generic area as hereinbefore disclosed. Various modifications and embodiments of this invention can be made without departing from the spirit and scope thereof.

What is claimed is:

1. A portable, self-contained apparatus for the generation of hydrogen gas resulting from the contact of a liquid fuel with a solid metallic catalyst, said apparatus having the ability to vary the hydrogen production rate automatically as required to satisfy a variable consumption rate, said apparatus comprising in combination, a first body section comprising a reaction chamber and a catalyst zone, said catalyst disposed in said chamber in such a manner that as the level of the fuel rises in said chamber, it contacts increasing amounts of catalyst; a quick disconnect fitting connecting the upper portion of said reaction chamber with the exterior of the apparatus; a second body section contiguous to said first body section and comprising a pressurizable liquid fuel chamber, a sealable inlet means connecting said fuel chamber to the exterior of the apparatus, a passage extending from a point near the lower portion of said fuel chamber to the lower portion of said reaction chamber and a cut-off valve for opening said passage from said fuel chamber to said reaction chamber.

2. A portable, self-contained apparatus for the generation of hydrogen gas resulting from the contact of a liquid fuel with a solid metallic catalyst, said apparatus having the ability to vary the hydrogen production rate automatically as required to satisfy a variable consumption rate, said apparatus comprising, in combination, an upper first body section comprising a reaction chamber and a noble metal catalyst, said catalyst disposed in said chamber in such a manner that as the level of liquid fuel rises in said chamber it contacts increasing amounts of catalyst; a quick disconnect fitting connecting the top of said reaction chamber with the exterior of the apparatus; a pressure relief valve; a second body section below said first body section and comprising a pressurizable liquid fuel chamber; a sealable inlet means connecting said fuel chamber to the exterior of the apparatus; a passage extending from a point near the bottom of said fuel chamber to the bottom of said reaction chamber and a cut-off valve for opening said passage from said fuel chamber to said reaction chamber.

3. A portable, self-contained apparatus for the generation of hydrogen gas resulting from the contact of an aqueous solution of sodium borohydride with a Raney nickel catalyst; said apparatus having the ability to vary the hydrogen production rate automatically as required to satisfy a variable consumption rate, said apparatus comprising, in combination, a first body section comprising a reaction chamber having a conical shaped bottom and Raney nickel lining the walls of said chamber; a quick disconnect fitting connecting the top of said reaction chamber with the exterior of the apparatus; a pressure relief valve; a second body section below said first body section and comprising a pressurizable liquid fuel chamber, a sealable inlet means connecting said fuel chamber to the exterior of the apparatus, a passage connecting the bottom of said fuel chamber to the bottom of the conical shaped portion of said reaction chamber and a cut-off valve for opening said passage from said fuel chamber to said reaction chamber.

References Cited

UNITED STATES PATENTS

| | | | |
|---|---|---|---|
| 591,367 | 10/1897 | Beck | 48—28 |
| 663,240 | 12/1900 | Remington | 48—31 |
| 767,289 | 8/1904 | Kirkwood | 23—282 |
| 3,094,493 | 6/1963 | Nixon | 252—466 |
| 3,139,408 | 6/1964 | Tumer et al. | 252—466 |
| 3,174,833 | 3/1965 | Blackmer | 23—282 |

MORRIS O. WOLK, Primary Examiner

R. E. SERWIN, Assistant Examiner